(12) United States Patent
Antanaitis et al.

(10) Patent No.: US 7,957,875 B2
(45) Date of Patent: Jun. 7, 2011

(54) METHOD AND APPARATUS FOR PREDICTING BRAKING SYSTEM FRICTION

(75) Inventors: David B. Antanaitis, Northville, MI (US); Chia N. Yang, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 672 days.

(21) Appl. No.: 12/015,597

(22) Filed: Jan. 17, 2008

(65) Prior Publication Data
US 2009/0187320 A1    Jul. 23, 2009

(51) Int. Cl.
*G06F 19/00*    (2011.01)
(52) U.S. Cl. .............. 701/70; 701/1; 701/71; 701/77; 701/78; 188/1.11 R; 303/152; 303/155
(58) Field of Classification Search .................. None
See application file for complete search history.

(56) References Cited

U.S. PATENT DOCUMENTS

| | | | | |
|---|---|---|---|---|
| 4,703,429 A * | 10/1987 | Sakata | ............................ | 701/96 |
| 5,511,859 A * | 4/1996 | Kade et al. | ......................... | 303/3 |
| 5,586,028 A * | 12/1996 | Sekine et al. | ...................... | 701/1 |
| 5,615,933 A * | 4/1997 | Kidston et al. | ................. | 303/152 |
| 5,676,434 A * | 10/1997 | Ichikawa et al. | .............. | 303/150 |
| 5,904,215 A * | 5/1999 | Ikeda | ............................ | 180/169 |
| 6,015,192 A * | 1/2000 | Fukumura | ...................... | 303/140 |
| 6,086,166 A * | 7/2000 | Fukasawa | ...................... | 303/152 |
| 6,161,073 A * | 12/2000 | Tange et al. | ...................... | 701/96 |
| 6,516,925 B1 * | 2/2003 | Napier et al. | ............. | 188/112 A |
| 6,668,983 B2 * | 12/2003 | Drennen et al. | ........... | 188/181 T |
| 6,909,959 B2 * | 6/2005 | Hallowell | ....................... | 701/88 |
| 7,062,369 B2 * | 6/2006 | Rader et al. | ...................... | 701/79 |
| 7,248,958 B2 * | 7/2007 | Watanabe et al. | ................ | 701/70 |
| 7,320,506 B2 * | 1/2008 | Fagergren et al. | ............. | 303/191 |
| 2003/0163236 A1 * | 8/2003 | Rader | ............................ | 701/70 |
| 2004/0138831 A1 * | 7/2004 | Watanabe et al. | ............... | 702/33 |
| 2006/0097567 A1 * | 5/2006 | Butler et al. | ..................... | 303/20 |
| 2006/0220449 A1 * | 10/2006 | Svensson | ......................... | 303/20 |
| 2007/0068220 A1 * | 3/2007 | Mahajan et al. | ..................... | 73/9 |
| 2007/0194623 A1 * | 8/2007 | Miyazaki | ....................... | 303/191 |
| 2007/0273204 A1 * | 11/2007 | Kodama et al. | ................ | 303/146 |
| 2007/0299593 A1 * | 12/2007 | Karnjate et al. | ................. | 701/70 |
| 2008/0015766 A1 * | 1/2008 | Butler et al. | ..................... | 701/79 |
| 2009/0012686 A1 * | 1/2009 | Maeda et al. | .................... | 701/70 |

FOREIGN PATENT DOCUMENTS

DE    19523111 A1    1/1997

(Continued)

*Primary Examiner* — Khoi Tran
*Assistant Examiner* — Jonathan L Sample
(74) *Attorney, Agent, or Firm* — Quinn Law Group, PLLC (57) ABSTRACT

A brake system control method determines vehicle operating conditions, compares the conditions to an allowable range, and uses a neural network to predict an expected coefficient of friction when the conditions are within the range. When the conditions fall outside of the range, the method determines an amount of required braking force using a constant coefficient of friction, and calculates the required braking force using the expected coefficient of friction when the conditions are within the range. The vehicle operating conditions include a vehicle speed, brake pressure, modeled brake rotor temperature, and apply state. The expected coefficient is multiplied by a constant or a calculated correction factor. A vehicle has an engine, transmission, and braking system, with a controller and an algorithm for predicting a coefficient of friction for two brake rotors, calculating a hydraulic brake pressure, and for applying the braking system using the hydraulic brake pressure.

15 Claims, 4 Drawing Sheets

FOREIGN PATENT DOCUMENTS

| | | |
|---|---|---|
| DE | 10011270 A1 | 9/2001 |
| DE | 10127481 A1 | 1/2002 |
| DE | 10105638 A1 | 8/2002 |
| DE | 102007008929 A1 | 9/2007 |
| DE | 102006015034 A1 | 10/2007 |
| JP | 06-286630 | * 10/1994 |

* cited by examiner

METHOD AND APPARATUS FOR PREDICTING BRAKING SYSTEM FRICTION

TECHNICAL FIELD

The invention relates generally to a method and apparatus for optimizing or smoothing a blended braking event in a vehicle braking system that is operable for combining electronic or regenerative powertrain braking torque with conventional frictional braking to achieve a desired rate of deceleration, and in particular to a method and apparatus utilizing both a neural network model for predicting an expected braking friction value and an adaptive model for adjusting an output of the neural network model in response to a calculated system error.

BACKGROUND OF THE INVENTION

Conventional automotive vehicles typically include a brake pedal that is operatively connected to a brake lever or arm. The motion of the brake arm in turn actuates a braking mechanism to thereby slow and/or stop the vehicle, typically using an applied hydraulic pressure. For example, stepping on a brake pedal exerts a force on a master cylinder, which then pressurizes various hydraulic lines that supply the pressurized fluid to the various brake corners, i.e. each of the wheels of the vehicle. At each brake corner, the pressurized fluid powers an actuator, such as a piston, which forces a friction surface of a brake pad against a rotating brake drum or disc. The rate of deceleration imparted to the vehicle depends on the amount of force originally applied to actuate or depress the brake pedal, and on the travel position of the brake pedal within or along its range of motion.

By way of contrast, a by-wire or electronic braking system (EBS) is often used in electric vehicles, as well as in hybrid vehicles which are alternately and selectively powered by an internal combustion engine or fuel cell and one or more electric motor/generators. Using an EBS, the braking command or input applied as a force to a brake pedal by an operator of the vehicle is converted by an encoder device into an electrical braking signal. This electrical braking signal, also known as an electronic braking torque request, is then relayed or communicated to the point of application, where one or more brake actuators operate in response to the communicated signal to slow or stop the vehicle.

Total braking torque in a vehicle having both an EBS and a conventional braking system may be applied using a blended combination of friction braking mechanisms and electronic braking torque, the latter of which is usually applied as an opposing torque to a braking unit positioned in proximity to each wheel, and/or to a transmission output shaft, thereby slowing the vehicle in a precisely controlled manner. However, the difficulty in precisely combining conventional friction braking and electronic braking torque may result in a less than optimal smoothness and/or continuity of such a blended braking event.

SUMMARY OF THE INVENTION

Accordingly, a method is provided for determining a required braking force in a vehicle. The method includes comparing a plurality of vehicle operating conditions to an allowable input range, and predicting a coefficient of friction corresponding to the various operating conditions when they fall within the allowable range. When the operating conditions fall outside of the allowable range, the method determines an amount of the required braking force using a constant coefficient of friction value, and calculates the required braking force using the predicted coefficient of friction when the operating conditions are within the allowable range.

In one aspect of the invention, the predicted coefficient of friction is predicted using a neural network.

In another aspect of the invention, the method further includes modeling a thermal profile of at least one brake rotor, with the plurality of vehicle operating conditions including a temperature of the at least one brake rotor as determined by the modeling step.

In another aspect of the invention, the operating conditions further include a speed of the vehicle, a brake pedal apply pressure, and a braking system apply state or status.

In another aspect of the invention, the method further includes multiplying the predicted coefficient of friction by an error correction factor prior to determining the required braking force.

In another aspect of the invention, calculating the error correction factor includes calculating an average value for the predicted coefficient of friction over a predetermined sample size, calculating an average value for an actual coefficient of friction over the predetermined sample size, with the actual coefficient of friction being determined at least partially from a deceleration response of the vehicle. The method further includes multiplying the predicted coefficient of friction by a first error correction value when a difference between the average value for the expected and actual coefficients of friction is less than or equal to a threshold value, and by a second error correction value when the difference is greater than or equal to the threshold value.

In another aspect of the invention, a method for optimizing a blended braking apply event of a vehicle includes providing a controller with a neural network, determining a set of vehicle operating conditions, feeding the set of vehicle operating conditions forward into an input layer of the neural network, and using the neural network for predicting an expected coefficient of friction corresponding to the plurality of vehicle operating conditions when the vehicle operating conditions are within an allowable range. The method includes determining an amount of a required braking force using a constant coefficient of friction value when the plurality of vehicle operating conditions are not within said allowable range, and calculating the required braking force using the expected coefficient of friction when the plurality of vehicle conditions are within the allowable range.

In another aspect of the invention, the method includes providing the neural network with a hidden layer having approximately 5 to 7 tan-sigmoid neurons, and feeding a set of output values from the input layer into each of the tan-sigmoid neurons.

In another aspect of the invention, a vehicle has a braking system having a set of front brake rotors, a set of rear brake rotors, a hydraulic braking mechanism, and an electronic braking mechanism which may be operatively combined to form a blended braking event, and a controller having a control algorithm and a neural network for controlling the braking system. The neural network receives a set of vehicle operating conditions and uses the set of conditions for predicting an expected coefficient of friction for each set of brake rotors, and the control algorithm calculates a hydraulic apply pressure from the expected coefficients of friction.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
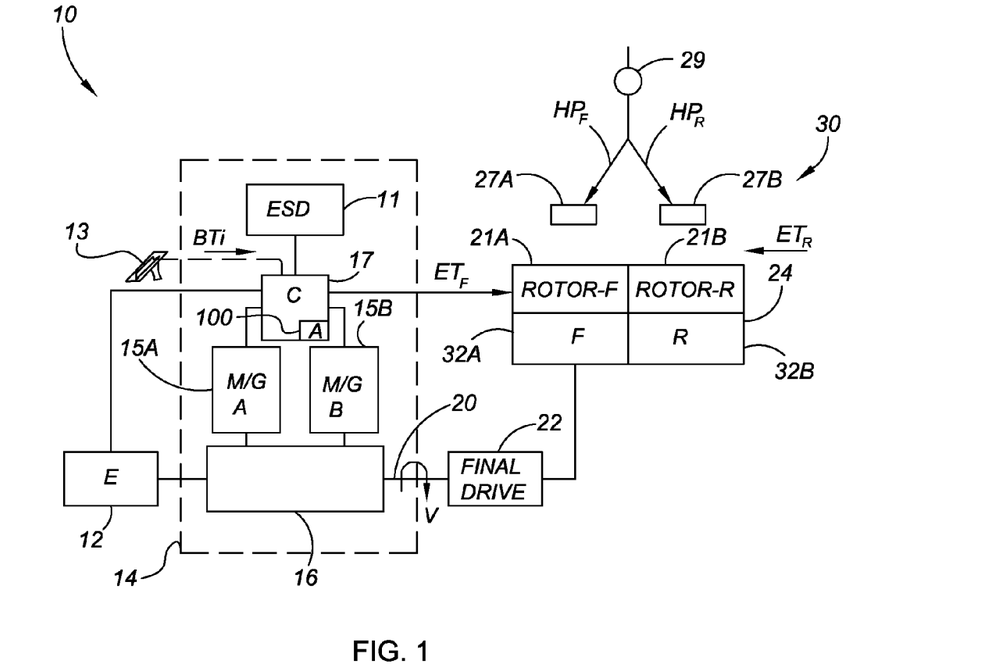
FIG. 1 is a schematic illustration of a vehicle having a braking system with electronic and hydraulic braking capabilities, and that is usable with the method or algorithm of the invention.

Referring to the drawings, wherein like reference numbers correspond to like or similar components throughout the several figures, and beginning with FIG. 1, a vehicle 10 includes an engine 12, such as an internal combustion engine, fuel cell, or another motive device suitable for providing energy for propelling the vehicle 10. The engine 12 is in driving connection with at least one gear set 16 of a transmission 14 for powering a plurality of wheels 24. The wheels 24 include a set of front wheels 32A, also labeled "F" in FIG. 1, and a set of rear wheels 32B, also labeled "R" in FIG. 1, with each set of wheels 32A, 32B having a respective brake rotor 21A, 21B.

The transmission 14 is configured in one embodiment as a hybrid transmission as shown, and therefore the vehicle 10 may be selectively propelled using the engine 12 and/or either or both of a pair of electric motor/generators 15A and 15B, also respectively labeled M/G A and M/G B. The transmission 14 includes an electrical storage device (ESD) 11, such as a battery or battery pack, and an integrated control unit or controller 17 having a braking system control method or algorithm 100, which will be described later hereinbelow. The controller 17 is configured or programmed for selectively exchanging energy between the ESD 11 and one or both of the motor/generators 15A, 15B, such as any energy captured during a regenerative braking event, as that term will be understood by those of ordinary skill in the art.

The transmission 14 has an output shaft or member 20 in driving connection with a final drive 22, which ultimately powers the front wheels 32A and/or the rear wheels 24B as discussed above. The vehicle 10 is equipped with a brake system 30 operable for decelerating the vehicle 10 using a combination of electronic braking torque and hydraulic braking force, as discussed previously above. The brake system 30 includes a master cylinder 29 or other device operable for pressurizing a supply of brake fluid (not shown) to provide a required hydraulic pressure (arrow $HP_F$, $HP_R$) to a respective actuator 27A, 27B at or near each brake rotor 21A, 21B. The brake system 30 is also operable for generating a required amount of braking torque electronically, i.e. by selectively exchanging energy between the ESD 11 and one or both motor/generators 15A, 15B to provide an opposing torque to the brake rotors 21A, 21B and/or the output member 20 to slow or stop the vehicle 10. This electronic braking torque is represented in FIG. 1 as the arrows $ET_F$ and $ET_R$ for the front and rear wheels 32A, 32B, respectively.

The vehicle 10 is therefore equipped with a braking input device 13, such as a foot-operated brake pedal or other suitable device operable for commanding a particular level of requested braking force. The controller 17 is programmed or adapted for allocating or dividing the requested braking torque input level, represented in FIG. 1 as the arrow $BT_i$, between the electronic braking torque $ET_F$, $ET_R$ and the hydraulic braking pressure $HP_F$, $HP_R$, as needed to execute a blended braking event. In one embodiment, the braking torque input level (arrow $BT_i$) corresponds to or is determinable from the distance of travel of the input device 13, i.e. the pedal "travel", and the amount of force applied to the input device 13, i.e. the brake pedal apply force. The braking torque input level (arrow $BT_i$) is fed or relayed to the controller 17 as an input into various braking algorithms, including the method or algorithm 100 of the invention, which will be described later hereinbelow with reference to FIGS. 2 and 4, and another embodiment of the algorithm 100 which is shown as algorithm 200 in FIG. 5.

Figure 2:
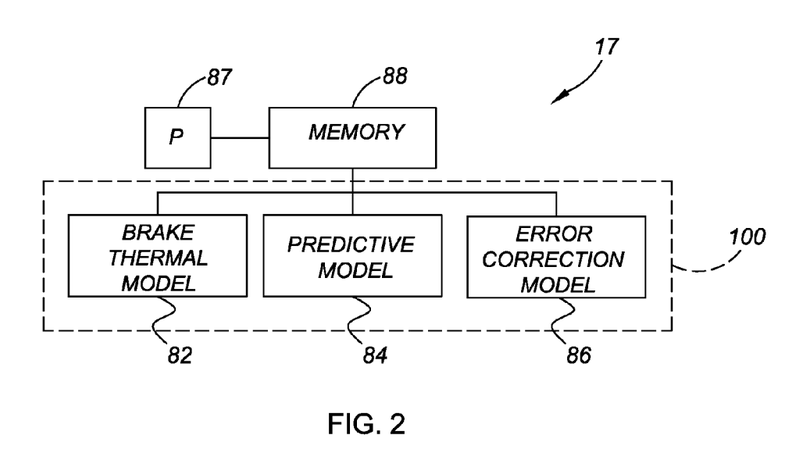
FIG. 2 is a schematic illustration of a controller usable with the vehicle of FIG. 1.
Figure 4:
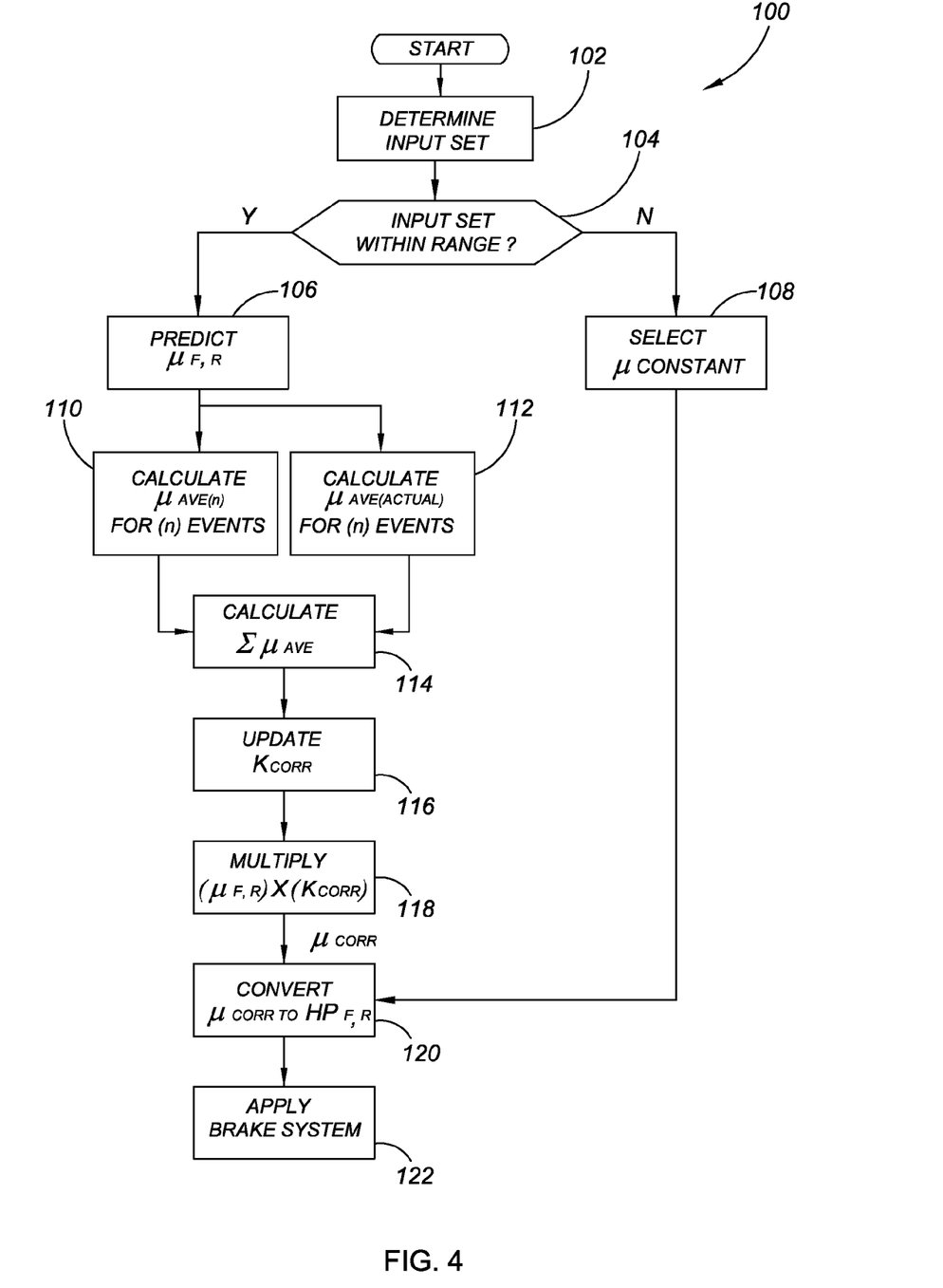
FIG. 4 is a graphical flow chart of the method or algorithm of the invention.
Figure 5:
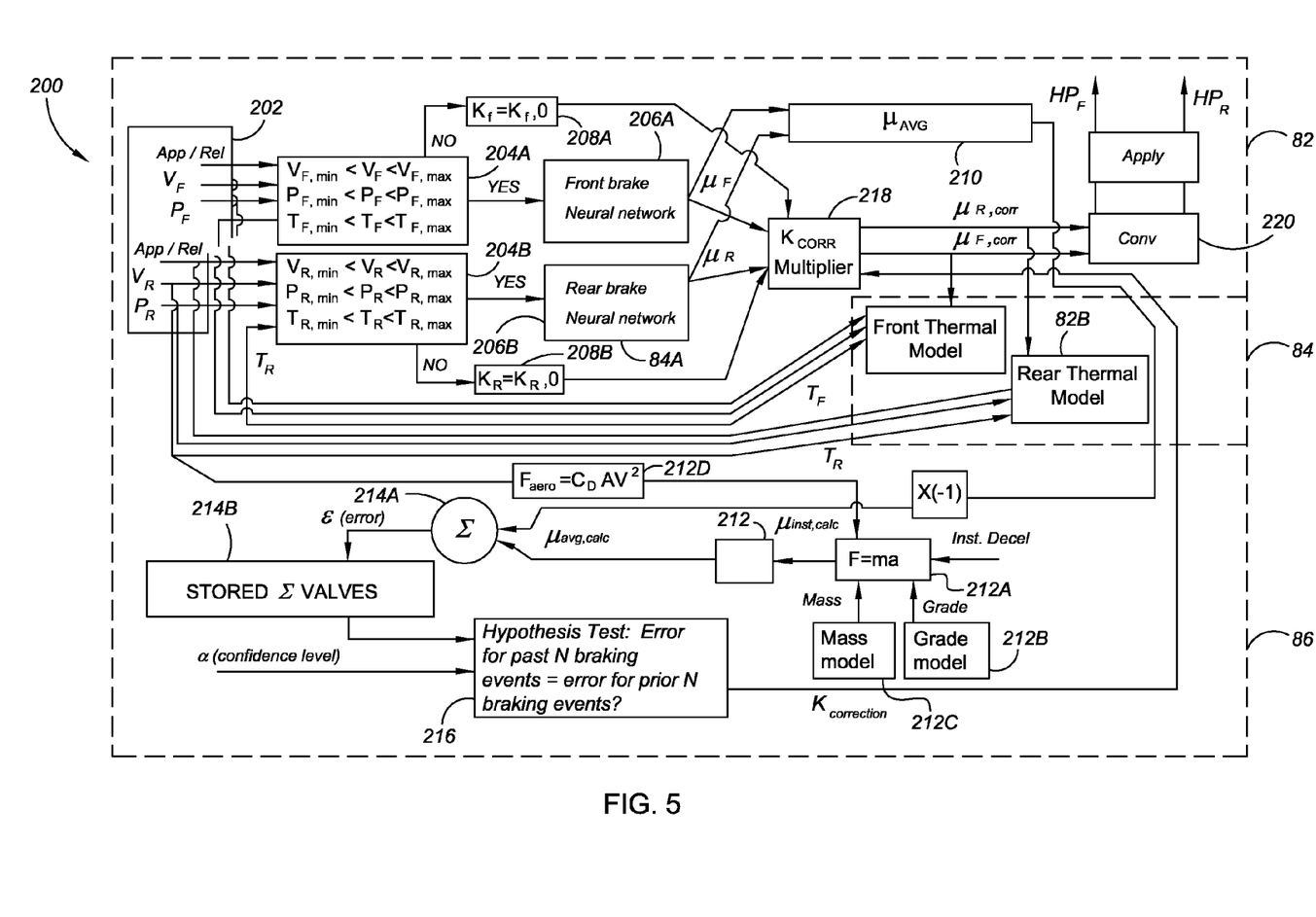
FIG. 5 is a graphical flow chart of another embodiment of the method or algorithm of the invention.

Referring to FIG. 2, the controller 17 includes a processor (P) 87 connected to a storage device or memory 88, such as a sufficient amount of magnetic and/or virtual memory for supporting the various functions of the algorithms 100 (see FIGS. 2 and 4) and 200 (see FIG. 5). The algorithms 100 and 200 are intended to improve the smoothness of a blended braking event as described above aboard a vehicle such as vehicle 10 of FIG. 1, i.e. any vehicle configured with both electronic or regenerative braking capabilities and conventional hydraulic braking capabilities. In a blended braking event, as that term is intended herein, the electronic braking and the conventional frictional braking functions combine to achieve a desired level of deceleration. That is, of the total amount of braking force commanded by an operator, i.e. the braking torque input level $BT_i$ (see FIG. 1), a portion of the applied braking force is provided via an electronically-applied opposing torque, and another portion of the applied braking force is provided via a hydraulically-applied frictional braking element, such as a brake pad or drum.

For optimal smoothness of the blended braking event, the algorithms 100 (see FIGS. 2 and 4) and 200 (see FIG. 5) utilize data from a brake thermal model 82, a predictive model 84, and an adaptive or error-correction model 86, which work together to determine a relationship between a hydraulic brake apply pressure and the resultant frictional effect at a friction interface of the brake components or corners, i.e. the brake rotors 21A, 21B (see FIG. 1). In accordance with the invention, this brake pressure-to-friction relationship is predicted in real-time based on various measured, detected, and/or computed operating conditions or input sets. The error-correction model 86 then adapts or adjusts the values predicted by the predictive model 84 in order to correlate a history of observed vehicle deceleration responses. That is, an expected friction response is predicted, and then the algorithms 100 and 200 look back in time to determine the accuracy of the prediction, while adjusting the predicted response whenever the error is sufficiently large or falls outside of a predetermined confidence level. The algorithms 100 and 200 then determine a proper opposing torque-to-hydraulic braking pressure relationship for the blended braking event described above.

Figure 3:
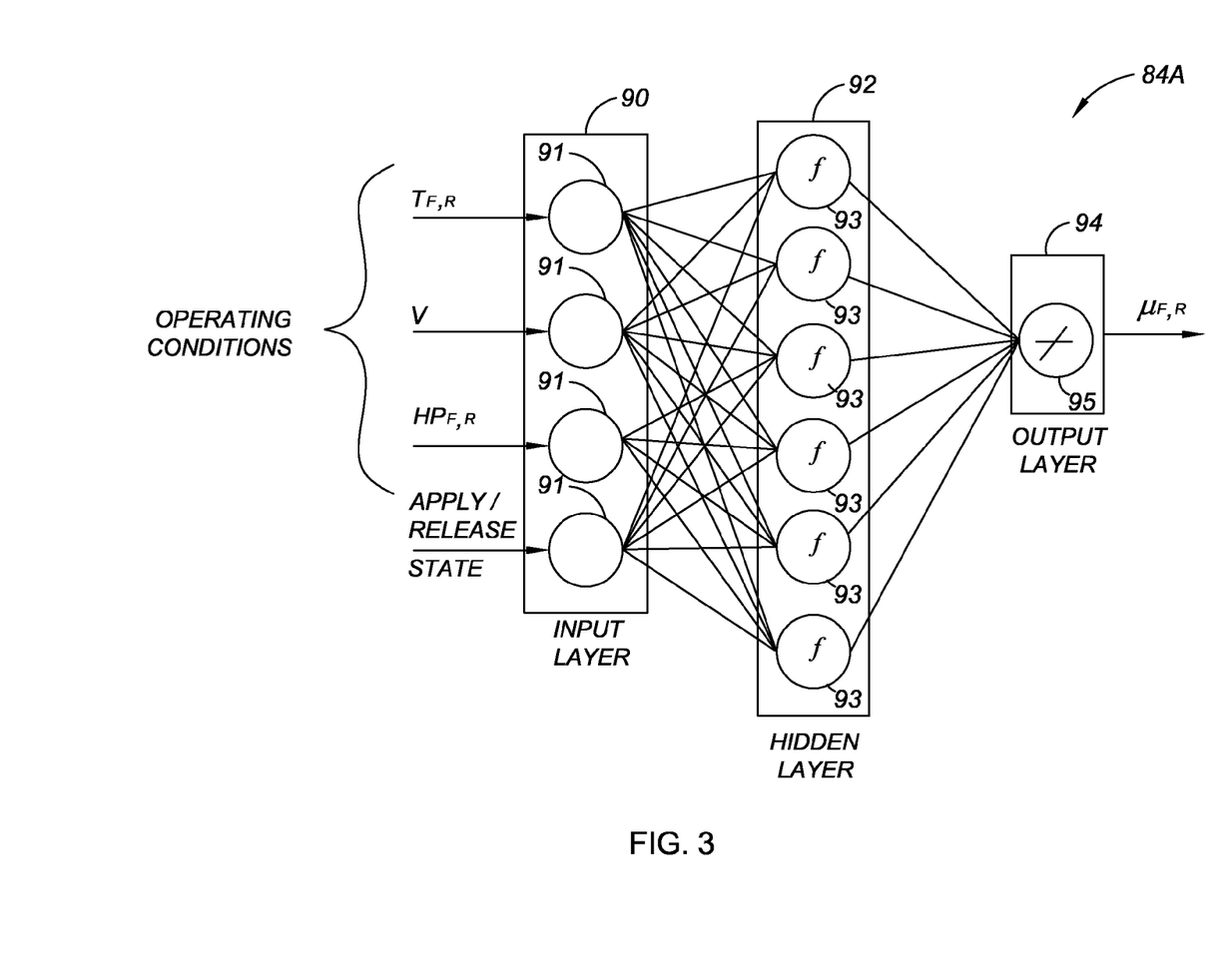
FIG. 3 is a graphical representation of an artificial neuron model or neural network usable with the method or algorithm of the invention.

Referring to FIG. 3, the predictive model 84 shown generally in FIG. 2 is shown in one embodiment as the predictive model 84A, with the predictive model 84A being an artificial neuron model or neural network. For clarity, the predictive model 84A will be referred to hereinafter as the neural network 84A. An input layer 90 includes a plurality of input neurons or nodes 91, each of which are configured to receive data, measurements, and/or other predetermined information from outside of the neural network 84A. As shown in FIG. 3, in one embodiment this information or input set includes, referring briefly to FIG. 1, the temperature of the front and rear brake rotors 21A, 21B (see FIG. 1), the speed V of the vehicle 10, typically the rotational speed of the output member 20 and/or each of the brake rotors 21A, 21B, the measured hydraulic braking pressure (arrows $HP_F$, $HP_R$) at the respective front and rear wheels 32A, 32B (see FIG. 1), and the apply/release state of the brake system 30 (see FIG. 1), which may be a binary or on/off signal corresponding to whether the brakes are being applied or released, as determined by the controller 17 and described later hereinbelow.

The predictive model 84A or neural network further includes at least one "hidden" layer 92 containing a plurality of neurons or nodes 93 that receive and pass along information output from the nodes 91 of the input layer 90 to other neurons or nodes of another hidden layer (not shown) if used, or to an output layer 94. The output layer 94 contains at least one output neuron or node 95 that communicates or transmits information outside of the predictive model 84A or neural network, such as to the error correction model 86 (see FIG. 2) of the algorithm 100. In the embodiment of FIG. 3, each of the neurons or nodes 93 of the hidden layer 92 employ a tan-sigmoidal transfer or activation function, and the neuron or node 95 of the output layer 94 employs a purely linear transfer or activation function 95, each of which will be understood by those of ordinary skill in the art of neural networks, although other transfer functions may be used within the scope of the invention to achieve the desired level of predictive accuracy. In one embodiment, the neural network 84A is trained using the known Levenberg-Marquardt back-propagation algorithm, but training is not so limited, with any other suitable training method or algorithm being usable with the invention.

As will be understood by those of ordinary skill in the art, neural networks are information processing paradigms that are able to look forward in time to predict a result using less than optimal, imprecise, or a relatively complex set of input data, such as the rapidly changing vehicle operating conditions described above and shown in FIG. 3. Neural networks adapt or "learn" via exposure to repeated training cycles, such as supervised or unsupervised input data sets, by dynamically assigning weights to each of the pieces of information of the input data set. Neural networks are not generally programmed to perform a specific task, but rather use associative memory to generalize about the totality or universe of the input set, i.e. the operating conditions shown in FIG. 3, thus predicting a future condition. For example, according to the invention the neural network 84A may be used to predict a coefficient of friction μ for each of the front and rear wheels 24 (see FIG. 1), i.e. $\mu_F$ and $\mu_R$, respectively.

A coefficient of friction (μ) between a brake friction material, such as a surface of a brake pad and a brake rotor, is a complex function of the shape and nature of the asperities present at or along the friction interface, i.e. the material composition, orientation, size, distribution, etc. of such asperities. These asperities are distributed in a variable manner over the surface of the friction material due to constantly changing and uneven pressure distribution, differences in sliding speed over the friction interface, and temperature difference over the friction interface. Brake friction is generally represented in terms of an "apparent" or expected friction value, or a coefficient thereof, which when multiplied by the area of an apply piston, hydraulic pressure, and design effective radius of a brake piston, results in a particular braking torque produced by the brake device. Apparent friction can be computed from recorded or historical pressure and braking torque data, but will generally vary considerably over the duration of a single braking event, due to the variable conditions of the friction interface over the course of the braking event.

Numerous factors or pieces of information affect the instantaneous value of apparent friction for any given brake corner, such as the brake rotors 21A, 21B of FIG. 1, with four factors in particular having a particularly strong predictive value for determining the apparent friction. These four factors are the rotor bulk temperature in the friction interface, or $T_{F,R}$ in FIG. 3, the hydraulic brake pressure, or $HP_{F,R}$ in FIGS. 1 and 3, the vehicle speed or V in FIG. 1, and the apply/release state of the braking system 30 (see FIG. 1), and therefore this combined information is used within the scope of the invention as the input data set to the input layer 90 described above, although various other factors may also be used to increase the accuracy of the various models used herein.

Of the factors detailed above, the bulk temperature of the rotors ($T_F$, $T_R$) may be determined using a model, such as the brake thermal model 82 shown in FIG. 2, which may be any model capable of accurately modeling a thermal response of a particular brake rotor during a braking event. As will be understood by those of ordinary skill in the art, such a model may use as inputs the rotational speed of the wheels 24 (see FIG. 1), hydraulic pressure $HP_{F,R}$ (see FIGS. 1 and 3), predicted frictional values such as a coefficient of friction (μ) described herein, and any other relevant factors to compute the amount of energy within the braking system 30 (see FIG. 1). The brake thermal model 82 uses previously stored brake rotor cooling data to compute the amount of energy leaving the brake system 30 (see FIG. 1), and uses the energy flux data along with a stored rotor material specific heat capacity versus temperature data, and rotor working mass information, to compute front and rear rotor bulk temperature as a function of time.

The apply/release state of the braking system, i.e. a discrete or binary value or signal describing whether the bakes are currently being applied or released, may be a measured or calculated signal that is determined in various ways. For example, one may use the braking torque input level $BT_i$ of FIG. 1 by tracking a cumulative peak apply pressure during each braking event, subtracting the instantaneous apply pressure from the cumulative peak pressure, and determining that a release event has occurred when the difference is greater than an appropriately selected threshold, and an apply event otherwise. Vehicle speed maybe directly or indirectly measured at the output member 20 (see FIG. 1), and/or at the wheels 24. The brake hydraulic pressure ($HP_F$, $HP_R$) may be measured using sensors, such as pressure transducers, positioned within a hydraulic system of the vehicle 10.

Referring to FIG. 4, the method or algorithm 100 shown in FIGS. 1 and 2 is presented in more detail. Beginning with step 102, the algorithm 100 determines the values of each member of the input set, such as by measuring, detecting, modeling, or otherwise determining the values of each of the operating conditions shown in FIG. 3 and discussed previously hereinabove. The input set is temporarily recorded or stored in memory 88 (see FIG. 2), and the algorithm 100 then proceeds to step 104.

At step 104, the algorithm 100 compares the input set determined at step 102 to a range or threshold of allowable values. This range is typically determined in a prior completed training process when using a neural network for the predictive model 84 (see FIG. 2), as the term "training process" will be understood by those of ordinary skill in the art of neural networks. If the determined input set falls within the allowable range, the algorithm 100 proceeds to step 106. Otherwise, the algorithm 100 proceeds to step 108.

At step 106, which is conducted within the predictive model 84 shown in FIG. 2, such as the neural network 84A discussed above with reference to FIG. 3, the algorithm 100 predicts the values of the coefficient of friction μ for each of the front and rear brake rotors (see FIG. 2), i.e. $\mu_F$ and $\mu_R$, respectively. In one embodiment, step 106 is performed using the neural network 84A described above with reference to FIG. 3, although other potentially less accurate predictive methods, such as linear regression analysis, may also be used for the step 106. After completing step 106, the algorithm exits the predictive model 84A (see FIG. 2) and enters the error-correction model 86 (see FIG. 2) by proceeding to steps 110 and 112.

At step 108, having determined at step 104 that the input set falls outside of the training range or the allowable range, the algorithm 100 does not activate the predictive model 84 of FIG. 2 in order to predict the required frictional value, or the coefficients of friction $\mu_{F,R}$ described above. Rather, the algorithm 100 defaults to a stored estimated or constant value μ(constant). Alternately, if needed for smooth braking control, the upper or lower limit of the allowable range of the input values may be relayed to the neural network 84A (see FIG. 3) instead of defaulting to a stored constant value, i.e. μ(constant). For example, if an input signal for the neural network 84A (see FIG. 3) has an allowable range of −10 to +10, and an input value of 12 is determined at step 102, the algorithm 100 may pass a value of 10 to the neural network 84A, with 10 being the upper limit of the allowable range. Likewise, if an input value of −12 is determined at step 102, the algorithm 100 may pass a value of −10 to the neural network 84A, i.e. the lower limit of the allowable range. Step 108 is intended to maintain the predictive accuracy of the neural network 84A (see FIG. 3) by preventing an abnormal or unexpected input set, i.e. an input set falling outside of the range for which the neural network was trained, from entering the input layer 90 (see FIG. 3) and thus compromising the accuracy thereof. Once the predicted value of brake friction or μ(pred) has been determined, the constant value μ(constant) has been determined, the algorithm 100 proceeds to step 120.

At step 110, the algorithm 100 records the predicted values $\mu_F$ and $\mu_R$ (see step 106) for a number (n) samples, i.e. a desired number of braking events, and then calculates an average for the (n) braking events. This average, or μave_pred (n), is temporarily stored in memory 88 (see FIG. 2). The algorithm 100 then proceeds to step 114.

At step 112, the algorithm 100 calculates an actual coefficient of friction for the (n) number of braking events, and then averages these values to generate an average actual value, or μave_actual(n). For example, various mass, grade, aerodynamic, or other models may be used to determine the "actual" frictional values from a completed braking event using known force equations, such as F=ma and its derivatives, as will be described below with reference to FIG. 5. Once the average actual value, μave_actual(n), has been determined, the algorithm 100 proceeds to step 114.

At step 114, the algorithm 100 compares the average values determined at steps 110 and 112, i.e. μave_pred(n) and μave_actual(n), respectively, and arithmetically determines the difference therebetween, as represented by the "Σ" function or symbol in FIG. 4. In FIG. 4, this difference is represented as eμ(ave), and the value eμ(ave) is compared to a stored threshold or allowable error, and the difference is recorded in memory 88 (see FIG. 2). The algorithm 100 then proceeds to step 116.

At step 116, the algorithm 100 updates a stored corrective factor, Kcorr, depending on the error value eμ(ave) determined at step 114 above. If the error value eμ(ave) does not exceed the allowable error, the stored corrective factor Kcorr is confirmed, thus retaining its current value. This value may be initially set to 1 during vehicle production, and continuously updated via algorithm 100 during the life of the vehicle. If the error value eμ(ave) exceeds the allowable error, the stored corrective value Kcorr is updated as necessary to account for the error. The algorithm 100 then proceeds to step 118.

At step 118, the algorithm 100 adjusts the predicted frictional values $\mu_{F,R}$ (avg_pred) previously predicted at step 106 by the updated corrective factor Kcorr. The adjustment may be a multiplication step, or alternately an addition/subtraction step, wherein the updated corrected factor Kcorr is respectively either multiplied by, or added to/subtracted from, the predicted average frictional values $\mu_{F,R}$ (avg_pred). In either embodiment, the value of Kcorr is arrived at via an appropriate equation for setting either Kcorr*μ(avg_pred)=μ(avg_actual), or Kcorr+μ(avg_pred)=μ(avg_actual). The algorithm 100 then proceeds to step 120.

At step 120, the algorithm 100 converts the corrected frictional value from step 118, i.e. the corrected predicted coefficient of friction μ(corr_pred) to a corresponding required hydraulic braking force or $HBF_{F,R}$. Step 120 maybe accomplished using a stored equation or series of equations correlating the coefficient of friction to a particular hydraulic braking force, a look up table or tables, or other suitable means. The algorithm 100 then proceeds to step 122.

At step 122, the algorithm 100 applies the braking system of the vehicle 10 (see FIG. 1) in a blended manner using the calculated required braking force $HP_{F,R}$ and any required electronic braking force or opposing torque applied to the output member 20 or the brake rotors 21A, 21B (see FIG. 1) to achieve the requested braking torque input level (arrow $BT_i$ of FIG. 1).

Referring to FIG. 5, another embodiment of the algorithm 100 of FIG. 4 is shown as the algorithm 200. Beginning with step 202, the algorithm 200 determines the input set as described above with reference to step 102 of algorithm 100, and feeds this input set forward to steps 204A and 204B. In the embodiment of FIG. 5, the brake thermal model 82 (also see FIG. 3) corresponds to a front and a rear thermal model 82A and 82B, respectively, with the thermal models 82A, 82B ultimately providing the brake thermal temperature values $T_F$ and $T_R$, respectively, while also receiving as inputs the input values for hydraulic pressure $HP_{F,R}$ and vehicle speed $V_{F,R}$.

At steps 204A and 204B, which are identical steps respectively addressing the front and rear rotors 21A, 21B of the vehicle 10 (see FIG. 1), the algorithm 200 determines whether the input set is within an allowable range for each value of the input set. If the input set fall within the allowable range, the algorithm 200 proceeds to steps 206A and 206B, otherwise the algorithm 200 proceeds to steps 208A and 208B.

At steps 206A and 206B, which are identical steps respectively addressing the front and rear rotors 21A, 21B (see FIG. 1) as with steps 204A and 204B above, the algorithm 200 enters the predictive model or neural network 84A (see FIG. 3). As explained with reference to FIG. 3, the steps 206A and 206B respectively predict the apparent or expected brake frictional values or coefficients of friction $\mu_F$ and $\mu_R$, and these values are then fed forward to each of steps 210 and 216.

At steps 208A and 20B, having determined at the respective steps 204A and 204B that the input set determined at step 202 falls outside of an allowable range, the algorithm 200 sets the value of a corrective factor $K_{F,R}$ to a predetermined or constant value $K_{F0,R0}$, and then proceeds to step 216.

At step 210, the algorithm 200 calculates an average of the geometric means for the predicted braking friction value or coefficient of friction $\mu_F$, $\mu_R$ for a predetermined sample size (n). A single average predicted value, or μ(avg_pred), describing the front and rear brake rotors is then normalized (box x(−1)) and then fed forward to step 214A.

At step 212A, the algorithm 200 received various measured and/or calculated data or information from various models, such as a grade model 212B for determining a force of gravity, a mass model 212, and an aerodynamic model 212D for determining aerodynamic drag, and then utilizes known equations and the F=ma relationship to solve for the braking forces. By weighting the braking force contribution at each of the front and rear axles of the vehicle 10 (see FIG. 1), a single value for a calculated coefficient of friction, or μ(calc) is determined, and this value is then recorded in memory 88 (see FIG. 2) for use by step 212.

At step 212, the algorithm 200 looks at the last (n) number of recorded values for μ(inst, calc) and calculates an average actual coefficient of friction, or μ(ave_actual), calc. The algorithm 200 then proceeds to step 214A.

At step 214A, the algorithm 200 takes the output values from steps 210 and 212 described above and calculates an error value, eμ(ave). At step 214B, the algorithm 200 then stores (n) number of error values in memory 88 (see FIG. 3), such as a circular buffer. As shown in FIG. 5, one embodiment uses a sample size of n=20, although any sufficiently large sample size may be used within the scope of the invention. The algorithm 200 then proceeds to step 216.

At step 216, a filtering step occurs to filter out or eliminate a substantial portion of the noise in the set of values or n samples. For example, the sample size (n) is split in half, with the earlier occurring half, or the first 10 samples in the embodiment where n=20, being compared to the latter half, occurring half, or the second 10 samples when n=20. If the error of the earlier half is equal to the error of the latter half within an allowable range, the algorithm 200 sets the new value of a correction factor Kcorr equal to the old or previous recorded value. If, however, the algorithm 200 determines that the earlier half is not the same as the latter half to within a user-selected confidence value, represented by the input α, the algorithm 200 updates the new value Kcorr according to the equation Kcorr, new=[μ(avg_calc)/μ(avg_pred)] The new value for Kcorr is then fed forward to step 218.

Alternately, step 216 may filter the noise by making a "running average" or filter correction, in which a number of data points or samples are stored and averaged, with the running average updating the value for Kcorr every time a new data point is added and an older data point is dropped or deleted. For example, in the example above wherein n=20 samples, the algorithm 200 will calculate a running 20-sample average filter on the μ(avg_calc) value, thus filtering out a substantial portion of noise in the μ(avg_calc) values.

At step 218, the algorithm 200 multiplies the values $\mu_F$ and $\mu_R$ predicted by the predictive model 84A at steps 206A and 206B by the corrective factor Kcorr determined at steps 208A, 208B, and/or 216. The corrected output values μF, corr and $\mu_R$, corr are then fed forward to step 220.

At step 220, the algorithm 200 converts the corrected output values $\mu_F$, corr and $\mu_R$, corr determined at step 218 into a corresponding hydraulic braking force $HP_{F,R}$ for each of the front and rear rotors 21A, 21B, respectively. The algorithm 200 then proceeds to step 222, wherein the controller 17 (see FIGS. 1 and 2) applies the values $HP_{F,R}$, such as by controlling one or more fluid control valves (not shown) to move the actuators 27A, 27B (see FIG. 1) as needed, to thereby brake the vehicle 10 (see FIG. 1) in a smoothly blended manner.

While the best mode for carrying out the invention have been described in detail, those familiar with the art to which this invention relates will recognize various alternative designs and embodiments for practicing the invention within the scope of the appended claims.

The invention claimed is:

1. A method for determining a required braking force in a vehicle having a brake rotor, the method comprising:
   determining values for a set of vehicle operating conditions, including determining a bulk temperature of the brake rotor;
   comparing said set of vehicle operating conditions to an allowable range;
   predicting, in real time using a neural network, an expected coefficient of friction at a friction interface of the brake rotor and using the set of vehicle operating conditions, said expected coefficient of friction corresponding to said set of vehicle operating conditions when said set of vehicle operating conditions are within said allowable range;
   determining an amount of the required braking force using a constant coefficient of friction value when said set of vehicle operating conditions are not within said allowable range; and
   calculating the required braking force using said expected coefficient of friction when said set of vehicle operating conditions are within said allowable range.

2. The method of claim 1, wherein said predicting an expected coefficient of friction includes processing each of said set of vehicle operating conditions through a different input node of an input layer of the neural network.

3. The method of claim 1, further comprising modeling a thermal profile of the brake rotor as the bulk temperature.

4. The method of claim 3, wherein said set of vehicle operating conditions further includes a speed of the vehicle, a hydraulic braking pressure, and a braking system apply state.

5. The method of claim 1, further comprising:
   multiplying said expected coefficient of friction by an error correction factor prior to determining the required braking force.

6. The method of claim 5, wherein said calculating said error correction factor includes:
   calculating an average value for said expected coefficient of friction over a predetermined sample size;
   calculating an average value for an actual coefficient of friction over said predetermined sample size, said actual coefficient of friction being determined at least partially from a recorded deceleration response of the vehicle;
   multiplying said apparent coefficient of friction by a first error correction value when a difference between said average values for said apparent and said actual coefficients of friction is less than or equal to a threshold value; and
   multiplying said apparent coefficient of friction by a second error correction value when said difference is greater than or equal to said threshold value.

7. A method for optimizing a blended braking event of a vehicle having a controller configured to selectively apply an electronic braking torque via a motor and a hydraulic braking force via a master cylinder during the blended braking event, the method comprising:
   providing the vehicle with a neural network having an input layer, at least one hidden layer, and an output layer;
   determining values for a set of vehicle operating conditions, including at least a bulk temperature of a brake rotor of the vehicle;
   feeding each condition in said set of vehicle operating conditions forward into a corresponding input node of said input layer of said neural network;

using said neural network for predicting an expected coefficient of friction at a friction interface of the brake rotor, in real time, wherein said expected coefficient of friction corresponds to said set of vehicle operating conditions when said set of vehicle operating conditions are within an allowable range;

determining an amount of a required braking force using a constant coefficient of friction value when said set of vehicle operating conditions are not within said allowable range;

calculating said required braking force using said expected coefficient of friction when said set of vehicle conditions are within said allowable range; and allocating the requested braking torque, via the controller, between the electronic braking torque and the hydraulic braking pressure to thereby execute the blended braking event.

8. The method of claim 7, wherein said determining said set of vehicle operating conditions includes modeling a thermal profile of said at least one brake rotor as the bulk temperature, and wherein said set of vehicle operating conditions includes the bulk temperature of the brake rotor as determined from said modeling.

9. The method of claim 8, wherein said determining said set of vehicle operating conditions further includes at least one of measuring a speed of the vehicle, detecting a brake apply pressure, and a determining an apply state of the braking system.

10. The method of claim 7, including configuring said hidden layer with a plurality of tan-sigmoid neurons, and feeding a set of output values from said input set into said plurality of tan-sigmoid neurons.

11. A vehicle comprising:

a braking system having a set of front brake rotors, a set of rear brake rotors, a hydraulic braking mechanism, and an electronic braking mechanism, wherein the hydraulic braking mechanism and the electronic braking mechanism may be applied during a blended braking event; and a controller having a control algorithm and a neural network for controlling said braking system in response to a requested braking torque, wherein the controller is configured to selectively apply the electronic braking torque as an opposing torque to at least one of the output member and the front or rear brake rotors, and to apply a hydraulic braking force to at least one set of the front and rear brake rotors via the hydraulic braking mechanism, during the blended braking event;

wherein said neural network is adapted for receiving a set of vehicle operating conditions including at least a bulk temperature of the brake rotors, and using said set of vehicle operating conditions for predicting, in real time via the neural network, an expected coefficient of friction for each of said sets of front and said rear brake rotors; and wherein said controller is configured for allocating the requested braking torque between the electronic braking torque and the hydraulic braking force to thereby execute the blended braking event.

12. The vehicle of claim 11, wherein said controller is operable for applying said hydraulic apply mechanism according to said hydraulic apply pressure that is calculated by said control algorithm.

13. The vehicle of claim 12, further comprising:

at least one sensor operable for directly detecting said hydraulic apply pressure, a speed of the vehicle, and an apply state of the braking system; and a brake thermal model configured for modeling a thermal response of each of said front and rear brake rotors to thereby determine the bulk temperatures;

wherein said set of vehicle operating conditions includes said hydraulic apply pressure, said speed, said apply state, and said thermal response.

14. The vehicle of claim 11, wherein the controller includes an error correction model for comparing an average value of said expected coefficients of friction to a corresponding average value of a calculated coefficient of friction to determine an error value therebetween, wherein the controller is configured for adjusting said expected coefficients of friction proportionately to said error when said error exceeds a predetermined confidence level.

15. The method of claim 1, wherein the vehicle includes a controller, a motor, and a master cylinder, the method further comprising:

automatically allocating the requested braking torque, via the controller, between an electronic braking torque from the motor and a hydraulic braking force from the master cylinder to thereby execute a blended braking event.

* * * * *